United States Patent [19]

Nasako et al.

[11] Patent Number: 5,174,367
[45] Date of Patent: Dec. 29, 1992

[54] THERMAL UTILIZATION SYSTEM USING HYDROGEN ABSORBING ALLOYS

[75] Inventors: Kenji Nasako; Takahiro Yonesaki; Akio Furukawa; Ikuo Yonezu; Masakazu Moroto; Naoki Hiro, all of Osaka; Toshihiko Saito, Kyoto, all of Japan

[73] Assignee: Sanyo Electric Co., Ltd., Osaka, Japan

[21] Appl. No.: 490,999

[22] Filed: Mar. 9, 1990

[30] Foreign Application Priority Data

Mar. 13, 1989 [JP] Japan .................. 1-61682
Mar. 13, 1989 [JP] Japan .................. 1-61683
Mar. 14, 1989 [JP] Japan .................. 1-63083

[51] Int. Cl.⁵ .................. F28D 21/00; F17C 7/00
[52] U.S. Cl. .................. 165/104.12; 62/46.2; 62/480
[58] Field of Search .................. 165/104.12; 62/480, 62/46.2

[56] References Cited

U.S. PATENT DOCUMENTS 4,188,795  2/1980  Terry .................. 165/104.12
4,626,018  11/1986  Takeshita et al. .................. 165/104.12
4,944,159  12/1988  Crozat .................. 62/480

FOREIGN PATENT DOCUMENTS

2800903  7/1979  Fed. Rep. of Germany .................. 165/104.12

Primary Examiner—Albert W. Davis, Jr.
Attorney, Agent, or Firm—Darby & Darby

[57] ABSTRACT

In order to make a thermal utilization system operable in a stable and efficient condition regardless the variation of the operating heat source used, the system is provided with three hydrogen absorbing alloys having different pressure-temperature characteristics, wherein absorption/desorption of hydrogen gas is performed in two steps, i.e. the hydrogen gas desorbed from a first alloy is absorbed by a second alloy at a predetermined pressure, and is absorbed by the third alloy at a higher pressure after it is desorbed from the second alloy in a case when the temperature of the operating heat source is low, while the hydrogen gas desorbed from the first alloy is directly transported from the first alloy to the third alloy to be absorbed there when the temperature of the operating heat source is high. Alternatively, two hydrogen absorbing alloys having different pressure-temperature characteristics are used in such a way that, when the temperature of the operating heat source is low, the hydrogen gas desorbed from the first alloy is pumped to the second alloy to be absorbed there, but the gas is directly transported from the first alloy to the second alloy to be absorbed there when the temperature of the operating heat source is high.

4 Claims, 10 Drawing Sheets

THERMAL UTILIZATION SYSTEM USING HYDROGEN ABSORBING ALLOYS

FIELD OF THE INVENTION

This invention relates to thermal utilization systems such as a heat-pump type refrigeration apparatus using hydrogen absorbing alloys.

BACKGROUND OF THE INVENTION

This type of thermal utilization systems has been reported in, for example Japanese Patent Publication 58-19955, Japanese Patent Publication No. 61-20205, in which two kinds of hydrogen absorbing alloys are utilized in such a way that one of them is heated at an operating temperature of 130° C.~150° C. to dissociate the hydrogen, which is transported to the other alloy and absorbed by this alloy exothermically, and endothermical reaction heat at returning the hydrogen provide refrigeration.

However, these conventional systems have difficulty in that they require high operating temperatures in the range of 130° C.~150° C., which is too high for such thermal system as utilizes a cogeneration system, factory waste heat, or solar heat as an operating heat source, so that desirable operating efficiency cannot be gained.

Other prior art such as Japanese Patent Publications Nos. 62-1188 and 62-1189 disclose similar refrigeration systems, which, however, have difficulty in that alloys must be heated so as to make the operating pressure of hydrogen, required for the absorption of the hydrogen dissociated from one alloy to the other, to exceed 20 atm. This implies that the container must be designed pressure-proof, resulting in a structural complexity of the container and accompanying sensible heat loss.

BRIEF SUMMARY OF THE INVENTION

The invention is intended to overcome these disadvantages. Namely, a primary object of the invention is to provide a thermal utilization system using hydrogen absorbing alloys that may operate in a stable condition with an improved high operating efficiency regardless the kind of the operating heat source used.

Another object of the invention is to provide a thermal utilization system using hydrogen absorbing alloys that may operate with an improved high operating efficiency under a reduced operating hydrogen pressure and with simple pressure-proof containers, thereby reducing the sensible heat loss therefrom.

In order to attain these objects, the thermal utilization system according to the invention has a first feature that it employs alternatively, depending on the temperature of the available operating heat source, a thermal cycle that utilizes three hydrogen absorbing alloys having different pressure-temperature characteristics, or a thermal cycle utilizing two of said hydrogen absorbing alloys except the one having intermediate characteristic.

When the temperature of the operating heat source is low, three hydrogen absorbing alloys are used, in which hydrogen disorbed or dissociated from the first alloy is absorbed by the third alloy in two steps: namely the hydrogen is first absorbed by the second alloy under a intermediate pressure and then disorbed from the second alloy and given off to the third alloy under a higher pressure in the similar way. On the other hand when the temperature is high, the hydrogen is disorbed from the first and given to the third alloy directly and absorbed there. In this way, regardless the temperature of the operating heat source, efficient operation of the thermal utilization system is possible.

The thermal utilization system of this invention has a second feature that it comprises a first alloy that disorbs hydrogen as it is heated by an operating heat source, a third hydrogen-absorbing alloy that absorbs said hydrogen, and a hydrogen pump for pumping the hydrogen pressure from said first alloy to said third alloy when the temperature of the operating heat source is low.

When the temperature of the operating heat source is low, the hydrogen is pressurized by the hydrogen pump to ensure the absorption by the third alloy, while when the temperature of the operating heat source is high, the hydrogen is instead transported directly to the third alloy, not through the pump. This enables efficient operation of the thermal utilization system regardless the possible change in temperature of the operating heat source.

The thermal utilization system of this invention has a third feature that the operating hydrogen pressure needed for the first and third hydrogen absorbing alloys are not more than 20 atm in said regeneration process and that said alloys have the characteristic that the minimum natural pressure difference, required for the transportation of at least 0.6 weight % of hydrogen reversibly, is equal to or less than 0.8.

In other words, the invention uses hydrogen absorbing alloys for which equilibrium hydrogen absorption pressure is not more than 20 atm near the upper limit of the absorption plateau at an ordinary room temperature, so that the thickness, and hence the heat capacity, of the container required for the pressure is not great.

With the minimum natural pressure difference of not more than 0.8, it is possible to lower the heating temperature, thereby improving the reversibility of the process and the efficiency for recovering "cold heat", which is defined as the heat extracted into the thermal system working as a refrigerator or a cold temperature source.

For the above thermal utilization system the first alloy is preferably either:

a hydrogen absorbing alloy having MgZn$_2$-type Laves phase structure and containing at least Zr, Mn, and Co;

a hydrogen absorbing alloy having AB$_5$-type hexagonal structure and containing at least rare-earth metals (such as La, Ce, Nd, Pr, Sm and a mixture of these metals) and Ni, and at least one of the first transition metals, Al, and Sn;

a hydrogen absorbing alloy having AB$_5$-type hexagonal structure and containing at least Ca, Ni, and at least one of the first transition metals, Al, Sn, and rare-earth metals;

a hydrogen absorbing alloy having AB-type cubic structure and containing at least Ti, Fe, Ni; or a mixture of these alloys.

On the other hand the second alloy is preferably either:

a hydrogen absorbing alloy having AB$_5$-type hexagonal structure and containing at least rare-earth metals (such as La, Ce, Nd, Pr, Sm and a mixture of these metals) and Ni, and at least selected one of the first transition metals, Al, and Sn;

a hydrogen absorbing alloy having MgCu$_2$-type Laves phase structure and containing at least Ti, Cr, and Mn;

a mixture of these alloys; or said hydrogen absorbing alloy having $AB_5$-type hexagonal structure and containing at least Ce.

BRIEF DESCRIPTION OF THE DRAWINGS

FIGS. 1 through 6 are given for the explanation of a first embodiment of the invention; in particular.

FIGS. 7 through 9 are given for the explanation of the second embodiment; in particular.

FIGS. 10 and 11 are given for the explanation of the third embodiment; in particular.

DETAILED DESCRIPTION OF THE PREFERRED EMBODIMENT

Embodiment 1

The concept of the embodiment is now explained before the details of the embodiment. As understood from the pressure-temperature characteristics shown in FIGS. 1 and 2, three kinds of hydrogen absorbing alloys that are operable at high, low, and intermediate temperature, respectively, are provided. The high-temperature alloy (which will be hereinafter referred to as $MH_1$) may be a rare-earth metal-Ni alloy such as a La rich Mm-Ni-Al system. The intermediate temperature alloy (which will be hereinafter referred to as $MH_2$) may be a rare-earth metal-Ni alloy such as a Mm-Ni-Al system. The low temperature alloy (which will be hereinafter referred to as $MH_3$) may be a rare-earth metal-Ni alloy.

Figure 1:
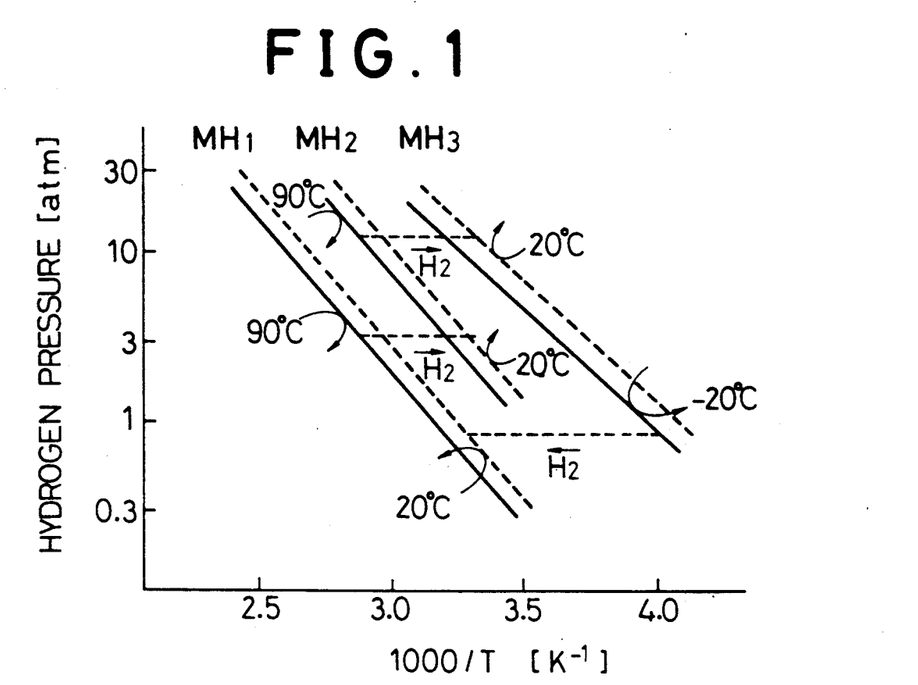
FIG. 1 is a graphical representation of the pressure-temperature characteristics of the thermal utilization system using three kinds of alloys, illustrating the principle of its operation.

These hydrogen absorbing alloys $MH_1$, $MH_2$, and $MH_3$ all participate in the operation of the thermal utilization cycle when the temperature of the operating heat source is low, say 90° C. When the temperature of the operating heat source is relatively high, say 130° C., the alloys other than $MH_2$ participate in the cycle, as seen in FIG. 1 and FIG. 2.

Namely, as the alloy $MH_1$ is heated by the operating heat source to 90° C. and $MH_2$ is cooled by cooling water of 20° C., $MH_1$ disorbs the so far absorbed hydrogen to dissociated $MH_2$ (first regeneration process). Next, as $MH_2$ is heated by the operating heat source to 90° C. and $MH_3$ is cooled by cooling water of 20° C., the hydrogen disorbed therefrom is transported to dissociated $MH_3$ (second regeneration process). Then the hydrogen is transported from $MH_3$ to $MH_1$ to recover cold heat at about $-20°$ C. through the endothermic desorption of hydrogen by $MH_3$ (cold heat generation process).

Figure 2:
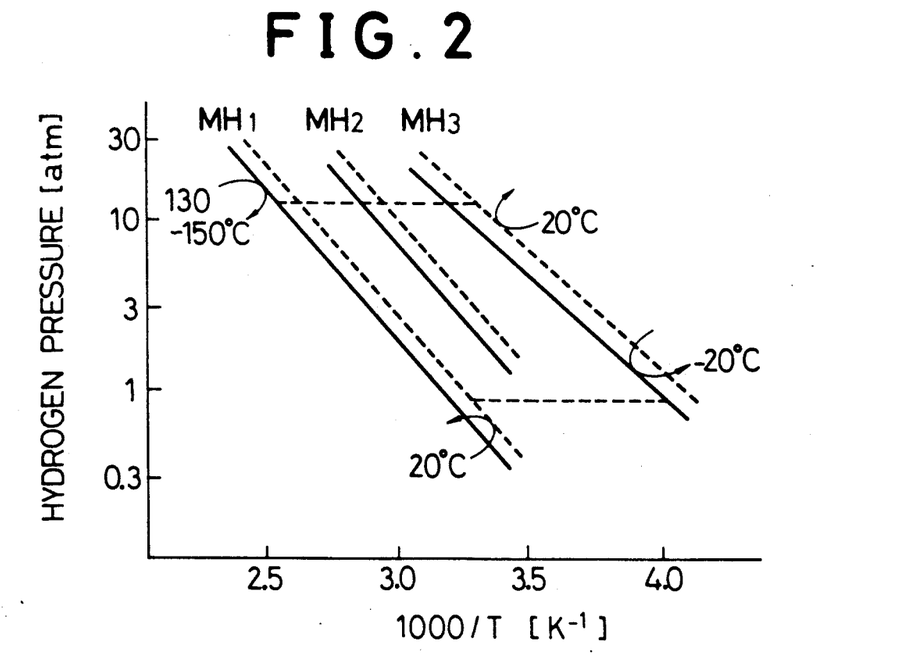
FIG. 2 is a graphical representation of the pressure-temperature characteristics of the thermal utilization system using two kinds of alloys, illustrating the principle of its operation.

On the other hand, in FIG. 2, as $MH_1$ is heated by the operating heat source to 130° C., while $MH_3$ is cooled by cooling water of 20° C., $MH_1$ disorbs the so far absorbed hydrogen to dissociated $MH_3$ (regeneration process). Thereafter the hydrogen is transported from $MH_3$ to $MH_1$ to gain cold heat at about $-20°$ C. through the endothermic desorption in $MH_3$ (cold heat generation process).

Continuous operation of the thermal cycle is now described with reference to FIGS. 3A and B, FIGS. 4A and B. The containers 1 through 6 are filled with $MH_1$, $MH_2$, $MH_3$, $MH_1$, $MH_2$, $MH_3$, respectively, and are each thermally connected with either an operating heat source, a cooling water serving as a cooling source, or a refrigeration load. They are connected with each other so as to interchange hydrogen depending on required conditions.

Figure 3A:
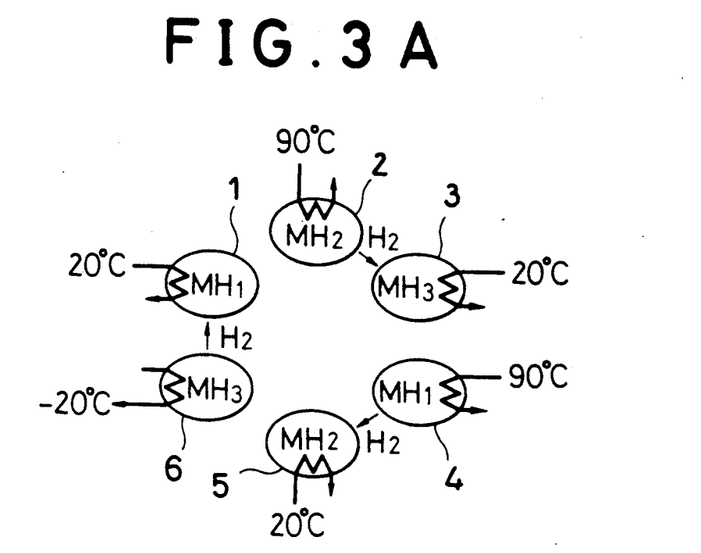
FIGS. 3A and B illustrate continuous operation of the thermal utilization system using the three kinds of alloys.
Figure 3B:
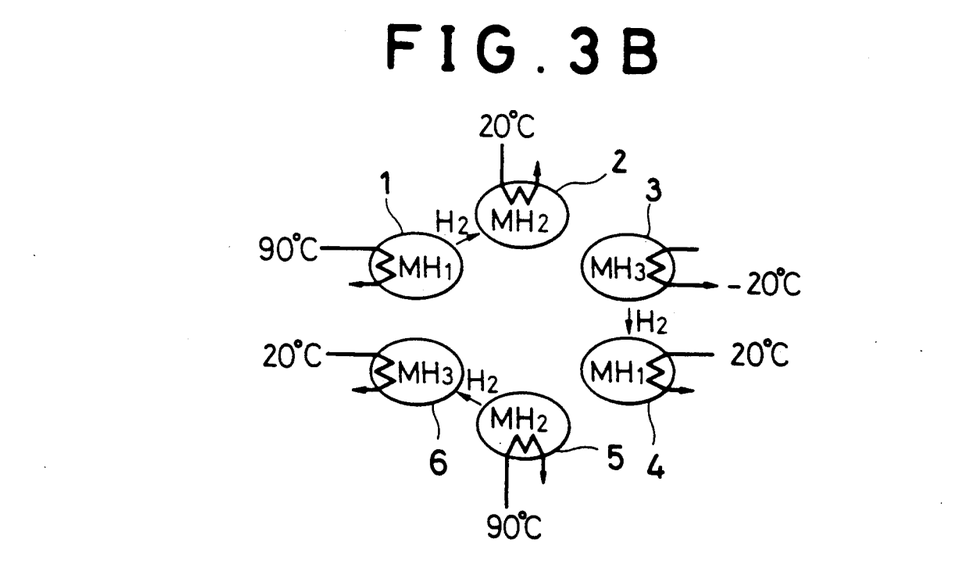

The case when the temperature of the operating heat source is relatively low (90° C.) is illustrated in FIGS. 3A and B. In FIG. 3A, hydrogen gas is simultaneously transported from the container 2 to 3, from the container 4 to 5, from the container 6 to 1, and through the endothermic desorption of gas by $MH_3$ in the container 6 cold heat of about $-20°$ C. is gained, which is provided to the refrigeration load. At the end of this process hydrogen gas is simultaneously transported from the container 1 to 2, from the container 3 to 4, and from the container 5 to 6 as shown in FIG. 3B, which provides the refrigeration load with refrigeration heat of about $-20°$ C. generated by the endothermic reaction with $MH_3$ in the container 3. These processes shown in FIGS. 3A and 3B will be repeated alternately.

Figure 4A:
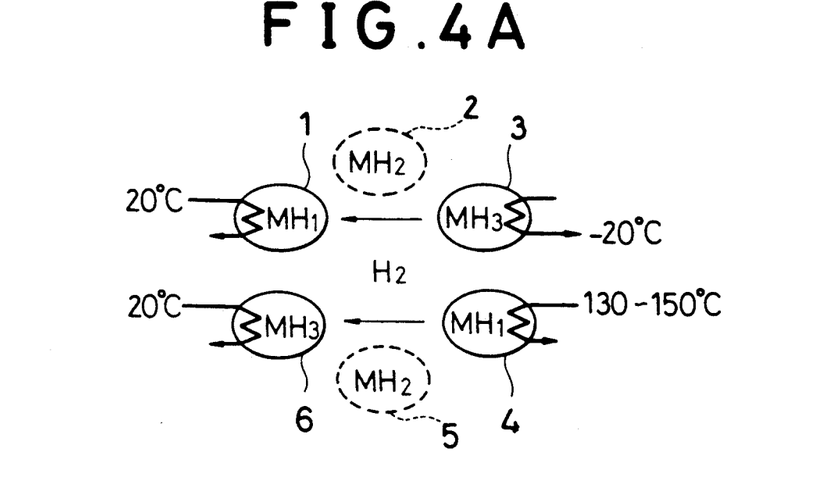
FIGS. 4A and B illustrates continuous operation of the thermal utilization cycle using the two kinds of alloys.
Figure 4B:
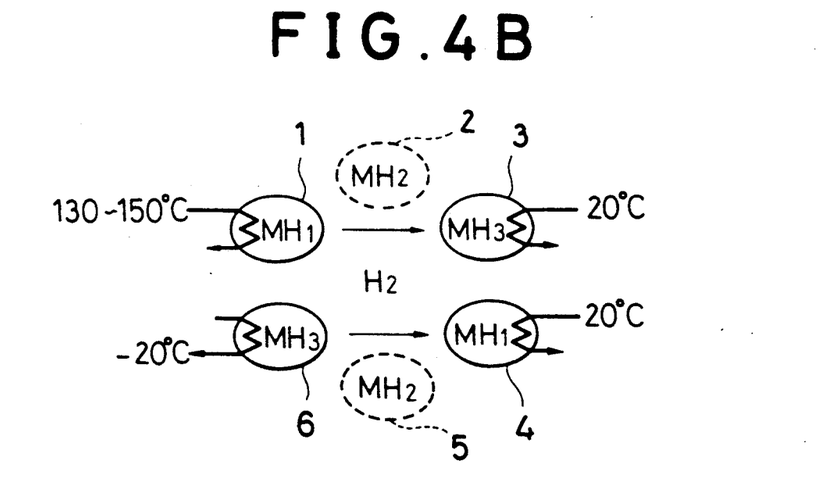

When the temperature of the operating heat source is relatively high (130° C. and above), hydrogen gas is transported simultaneously from the container 3 to 1, from the container 4 to 6, as shown in FIG. 4A. Next, hydrogen gas is simultaneously transported from the container 1 to 3, from the container 6 to 4, as shown in FIG. 4B. These procedures shown in FIGS. 4A and 4B will be also repeated alternately.

In this way either one thermal cycle using the three alloys or the other using the two alloys is selectively operated depending on the level of the temperature of the operating heat source, so that the temperature is measured by a temperature sensor or a pyrheliometer if the solar heat is used. The temperature at which the cycle is switched from one to the other may be set at 130° C., say.

Figure 5:
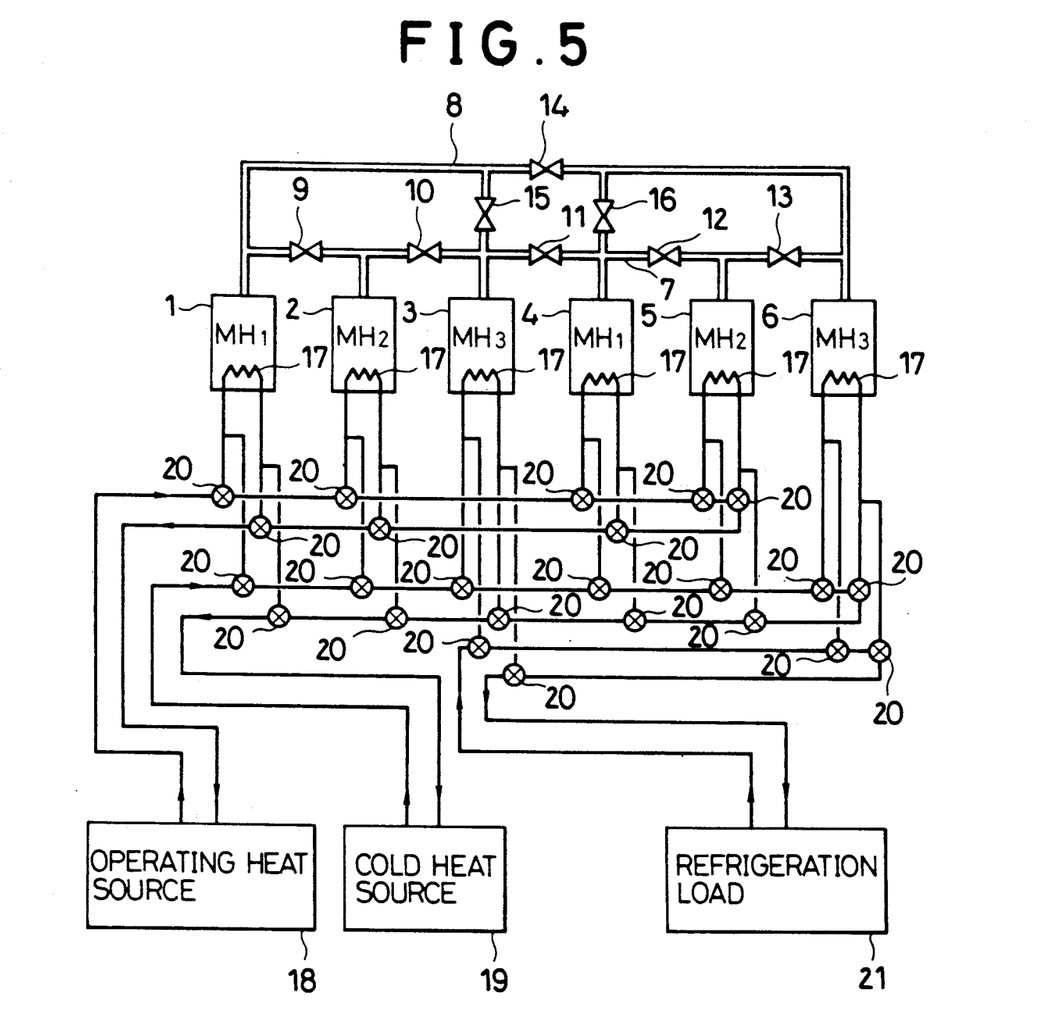
FIG. 5 shows the piping used for the first embodiment.

Referring to FIG. 5 details of the embodiment is now described. Containers 1 through 6 are filled with $MH_1$, $MH_2$, $MH_3$, $MH_1$, $MH_2$, $MH_3$, respectively. The container 1 and container 6 are connected with each other with a first and a second hydrogen gas pipes 7 and 8, respectively. The first pipe 7 is also connected with other containers 2 through 5. The pipes 7 between adjacent containers are provided with respective valves 9, 10, 11, 12, and 13.

The second pipe 8 has a valve 14, and valves 15 and 16 on the opposite side of the valve 14, respectively.

The containers 1 through 6 each have heat exchangers 17 for heating the alloys therein and for getting reaction heat (hot and cold heat). The containers 1, 2, 4, and 5 are connected in such a way that their heat exchangers 17 are selectively connected with the operating heat source 18 or with the 20° C. cold heat source 19 by means of switching valves 20. The containers 3 and 6 are connected in such a way that their heat exchangers 17 are selectively connected with the cold heat source 19 and the refrigeration load 21 by means of switching valves 20. The pipes between the respective heat exchangers 17 and the heat source 18, and between the cold heat source 19 and the refrigeration load 21 are provided for forced circulation of the heat media, which may be carried out by a pump and the like.

As mentioned above, a temperature sensor or pyrheliometer is used to measure the temperature level of the operating heat source 18, which level is compared in a control unit (not shown) with the predetermined temperature of 130° C., say, or with predetermined solar energy intensity. If the level is higher than the predetermined level, the control unit selects the thermal cycle using the two alloys $MH_1$ and $MH_3$, but selects the thermal cycle using the three alloys if the measured level is lower than the predetermined level. The valves 9 through 16 and the switching valves 20 are adapted to be either opened or shut accordingly to maintain the cycle selected.

The operation of the embodiment is now described. If the control units finds the measured temperature level of the operating heat source to be lower than the predetermined level, it controls the switching valves 20 in such a way that the heat exchangers 17 of the containers 1, 3, and 5 are connected with the cold temperature source 19, the heat exchangers 17 of the containers 2 and 4 are connected with the heat source 18, and the heat exchanger 17 of the container 6 are connected with the refrigeration load 21, and controls the valves 14, 10, and 12 to open so that the containers 1 and 6 are connected, containers 2 and 3 are connected, and the containers 4 and 5 are connected. This permits the container 6 to provide the refrigeration load 21 with cold heat of about −20° C. generated in the endothermic hydrogen desorption that has taken place in the container. At the end of this process the control unit controls the switching valves 20 so that the heat exchangers 17 of containers 1 and 5 are connected with the heat source 18, the heat exchangers 17 of containers 2, 4, and 6 are connected with the cold heat source 19, and the heat exchanger 17 of the container 3 is connected with the refrigeration load 21, and controls the valves 9, 11, and 13 to open or shut so that the containers 1 and 2 are connected, the containers 3 and 4 are connected, and the containers 5 and 6 are connected. In this case the container 3 provides the refrigeration load 21 with cold heat. Through such control of the switching valves 20 and the valves 9 to 16, these alternating operations may be repeated using three pairs of hydrogen absorbing alloys.

On the other hand if the control unit finds the temperature level of the operating thermal source 18 higher than the predetermined level, it controls the switching valves 20 so that the heat exchangers 17 of the containers 1 and 6 are connected with the cold temperature source 19, the heat exchanger 17 of the container 4 is connected with the heat source 18, and the heat exchanger 17 of the container 3 is connected with the refrigeration load 21, and controls the valves 15 and 16 to open so that the containers 1 and 3 are connected, containers 4 and 6 are connected. This permits the container 3 to provide the refrigeration load 21 with cold heat of about −20° C. generated in the endothermic hydrogen desorption that has taken place in the container. At the end of this process the control unit controls the switching valves 20 so that the heat exchangers 17 of containers 3 and 4 are connected with the cold heat source 19, the heat exchanger 17 of container 1 is connected with the heat source 18, and the heat exchanger 17 of container 6 is connected with the refrigeration load 21. In this way the hydrogen gas transported into the container 4 is transported back to the container 4, giving the refrigeration load the cold heat generated in the container 6 in the endothermic desorption reaction. Thus, through such control of the switching valves 20 and the valves 15 and 16, these alternating operations may be repeated using two pairs of hydrogen absorbing alloys $MH_1$ and $MH_3$.

Figure 6:
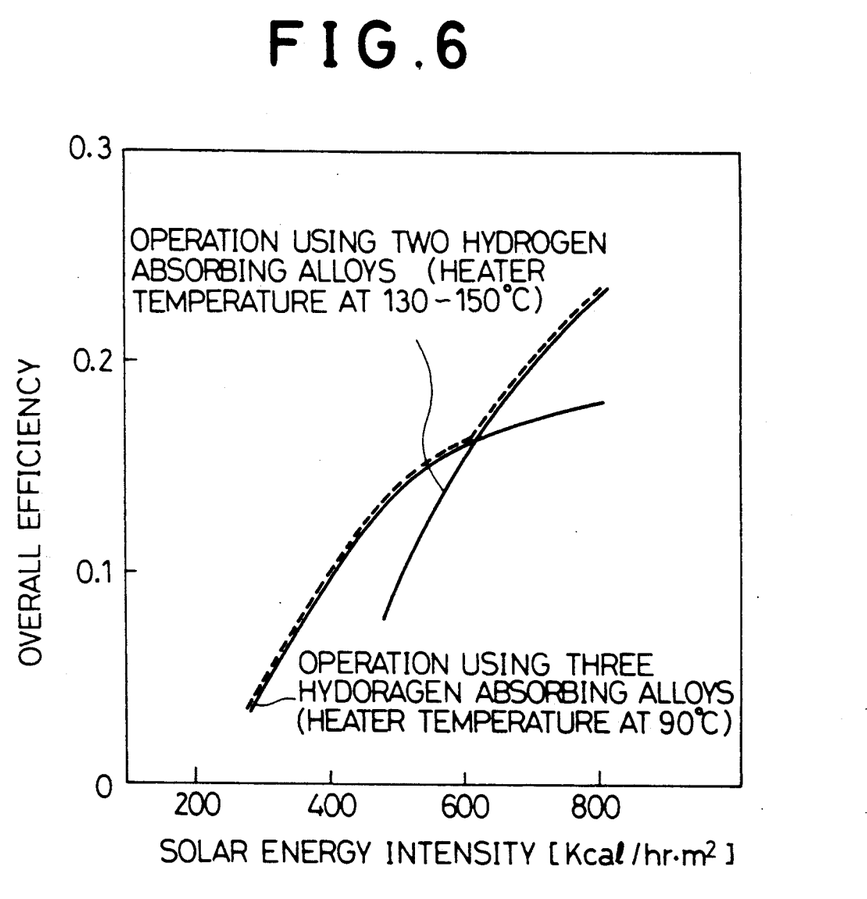
FIG. 6 is a graphical representation of the efficiency of the system in terms of the intensity of the solar energy used as an operating heat source.

FIG. 6 shows overall efficiencies of the thermal cycles using a solar energy heater as the operating heat source 18, for various degrees of solar energy intensity and in the case of cycles using three alloys and two alloys. As is apparent from this Figure, the two-alloy thermal cycle is operable with high efficiency for the solar intensity above 600 Kcal/hr.m$^2$, but otherwise operable with only limited efficiency. On the other hand the three-alloy thermal cycle is operable even for weak solar uintensity with desirable efficiency, but under intense solar energy it suffers from a great heat loss due to its structural complexity.

Therefore, it is possible to attain an extended and stable operation of the thermal cycles in a day-time by selectively using the three- and the two-alloy thermal cycles depending on the intensity of the solar energy (see the dotted curve in FIG. 6).

It should be understood that, although the first embodiment above has been described for the case in connection with an automatic selection of the thermal cycles, manual selection or timer-controlled selection may be alternatively employed.

Embodiment 2

The concept of the second embodiment is explained before its details. As shown in the pressure-temperature characteristics of FIGS. 7, two kinds of hydrogen absorbing alloys, namely a high temperature alloy $MH_1$ and a low temperature alloy $MH_3$ mentioned above are used. If the temperature of the operating heat source is 130° C. or above, the $MH_1$ alloy is heated at that temperature, while the $MH_3$ is cooled by the cooling water of about 20° C. The hydrogen dissociated from $MH_1$ is transported to $MH_3$. Then, as $MH_1$ is cooled at 20° C., hydrogen absorbed by $MH_3$ is retransferred to $MH_1$ to recover cold heat in the endothermic desorption by $MH_3$.

Figure 7:
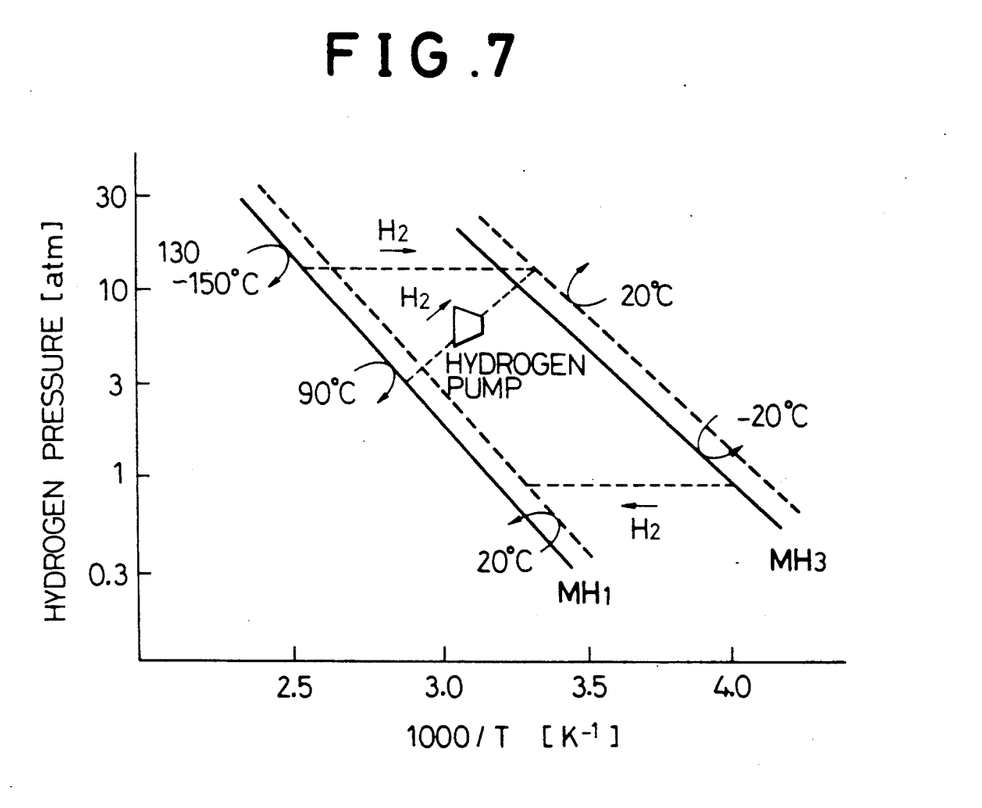
FIG. 7 is a graphical representation of the pressure-temperature characteristics of the thermal utilization system, illustrating the principle of its operation.

On the other hand if the temperature of the operating heat source is detected as being less than 130° C., for example 90° C. which is relatively a low temperature, an electric hydrogen pump (e.g. a compressor) is operated. The hydrogen pump forcibly transport hydrogen from $MH_1$ to $MH_3$ which has been cooled at about 20° C. to absorb the hydrogen. In this case additional heating of $MH_1$ by the heat source is also used. Then $MH_1$ is cooled to 20° C. while hydrogen is returned from MH$_3$ to MH$_1$ to recover cold heat by the endothermic desorption by MH$_3$.

In this way depending on the temperature level of the operating heat source, either an ordinary thermal cycle or the thermal cycle utilizing a hydrogen pump is selectively operated. The selective temperature for the cycles is set at, for example, 130° C. based on the heat source temperature measured by a sensor or on the solar energy intensity measured by a pyrheliometer.

Figure 8:
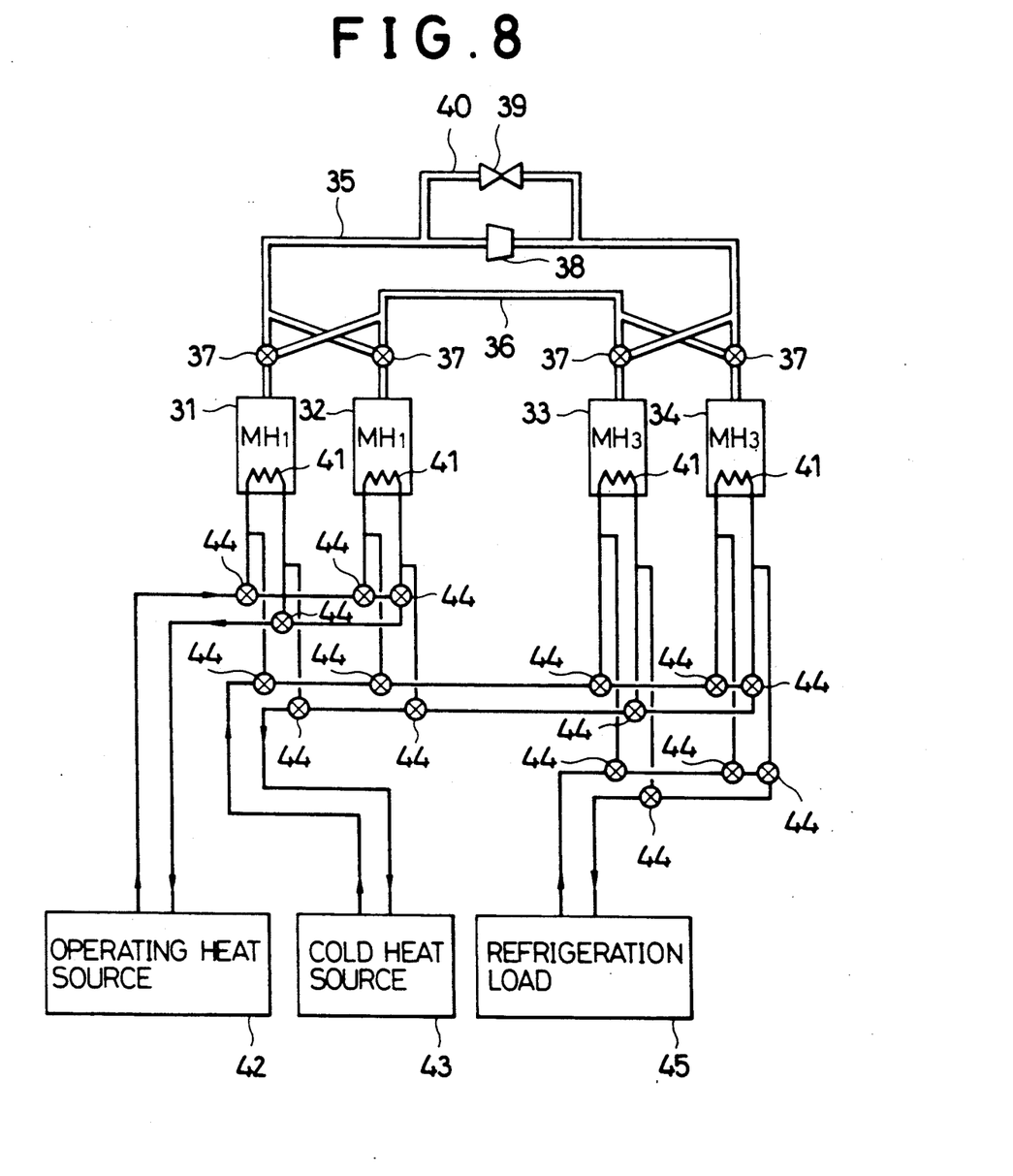
FIG. 8 shows the piping used for the first embodiment.

Referring to FIG. 8, details of the embodiment are now described.

Containers 31 and 32 are filled with a first hydrogen absorbing alloy MH$_1$ and containers 33 and 34 are filled with a second hydrogen absorbing alloy MH$_3$. The containers 31 and 34 are connected with a first hydrogen transport pipe 35, while the containers 31 and 34 are connected with a second transport pipe 36. Furthermore, the containers 31 and 34 may be connected also with the second transport pipe 36 while the containers 32 and 33 may be connected with the first transport pipe 35 by means of four three-way valves 37 provided in the pipes 35 and 36.

The first transport pipe 35 is provided with an electric compressor 38 acting as a hydrogen pump for forcibly transporting the hydrogen gas from the side of containers 31, 32 to the side of containers 33, 34. The pump 38 is provided with a bypass 40 having a bypass valve 39.

The containers 31, 32, 33, and 34 contain therein heat exchangers 41 for heating the alloys in the respective containers or for recovering the reaction heat. The heat exchangers 41 of the containers 31 and 32 may be selectively connected with either the operating heat source 42 or the cold heat source 43 containing 20° C. cooling water, by means of a switching valve 44. The pipes connected between the heat exchangers 41 and the heat source 42, the cold heat source 43, and the refrigeration load 45 are provided for forcibly transporting (hot or cold) heat media between them.

The temperature or the thermal level of said operating heat source 42 is measured by a temperature sensor or a pyrheliometer. A control unit (not shown) compared the measured level with the reference temperature (for example 130° C.). If the measured level is higher than the reference value, the unit provides an instruction to choose an ordinary thermal cycle, and, if not, to choose the other thermal cycle using the hydrogen pump 38, with the valves 37, 39, and 44 opened or closed in accordance with the instruction. During the use of the hydrogen pump 38 the heat from the thermal heat source 42 is also utilized.

Next, the operation of the embodiment is described. Based on the result of the comparison that the temperature of the heat source 42 is higher than the reference value, switching valves 44 are either opened or closed accordingly so that the heat exchanger 41 of the container 31 is connected with the heat source 42, the heat exchangers 41 of the containers 32 and 34 with the cold heat source 43, and the heat exchanger 41 of the container 33 with the refrigeration load 45, and the bypass valves 39 are opened and the three-way valves 37 are switched so that the containers 31 and 34 are mutually connected through the first transport pipe 35 and the bypass 40, and the containers 32 and 33 through the second transport pipe 36. As a result the hydrogen gas is transported from the container 31 to the container 34, and from the container 33 to the container 32, which container 33 desorbing the hydrogen is cooled to about −20° C. through the endothermic dissociation reaction, and provides the refrigeration load 45 with cold heat media. After the completion of this process the control unit controls the switching valves 44 to open or close so that the heat exchangers 41 of the containers 31 and 33 with the cold heat source 43, the heat exchanger 41 with the heat source 42, the heat exchanger 41 of the container 34 with the refrigeration load 45, and to open bypass valves 39 and switch the three-way valves 37 so that the containers 31 and 34 are connected through the second transport pipe 36 and the containers 32 and 33 are connected through a first transport pipe 35 and the bypass 40. Consequently, the hydrogen gas is transported from the container 34 to 31, and from the container 32 to the container 33, which container desorbing the hydrogen is cooled to about −20° C. through the endothermic dissociation reaction in the container 34 and provides the refrigeration load 45 with cold heat media.

Such alternate operations are repeated for sustaining a continuous thermal cycles.

On the other hand if the temperature of the heat source 42 is found less than the reference value, the control unit gives an additional instruction besides the above ones for closing the bypass valves 39 accordingly and for operating the hydrogen pump 38. The hydrogen gas is thus quite effectively transported between the container 31 and the container 34, and between the container 32 and the container 33.

Figure 9:
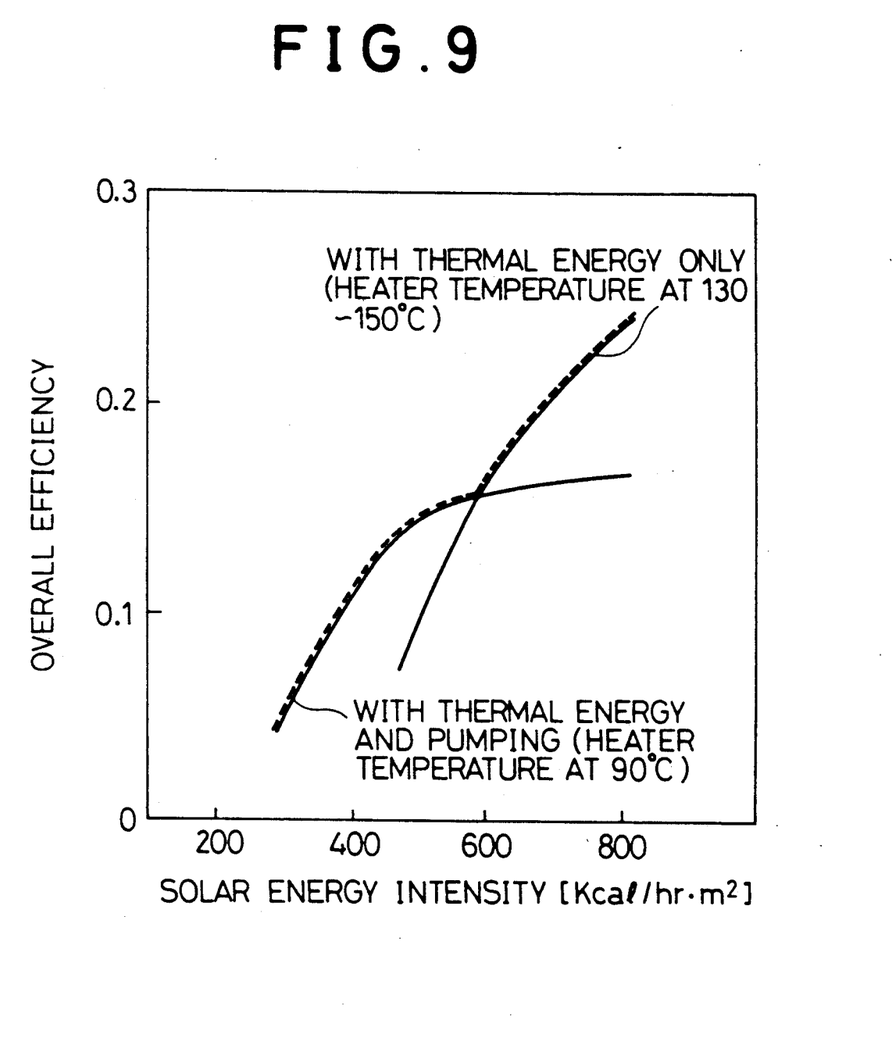
FIG. 9 is a graphical representation of the efficiency of the system in terms of the intensity of the solar energy used as an operating heat source.

With a solar energy as the operating heat source 42, an overall efficiencies of the normal thermal cycle using two alloys and the thermal cycle using a hydrogen pump 38, for various degrees of solar energy intensity, is shown in FIG. 9. As is apparent from this Figure, the simple two-alloy thermal cycle is operable with high efficiency for the solar intensity above 600 Kcal/hr.m$^2$, but otherwise operable with only limited efficiency. On the other hand, the thermal cycle using the hydrogen pump 38 is operable even for weak solar intensity with desired efficiency, but under intense solar energy it suffers from a great heat loss due to its structural complexity.

Therefore, such selective operation of the thermal cycles as shown in this embodiment may provide an extensive and stable day-time operation with improved efficiency (see dotted curve on FIG. 9).

It should be understood that, although only the automatic selection of the thermal cycles is employed in the above example for dealing with different conditions of temperature or the solar energy intensity, manual selection may be alternatively employed. When a solar heater is used, a timer may be employed for controlled daily operation.

Embodiment 3

A third embodiment using ZrMn$_{1.5}$Co$_{0.5}$Al$_{0.1}$ as a high temperature alloy MH$_1$, and with MmNi$_{3.7}$Co$_{0.8}$ used as MH$_3$ is now is explained.

Figure 10:
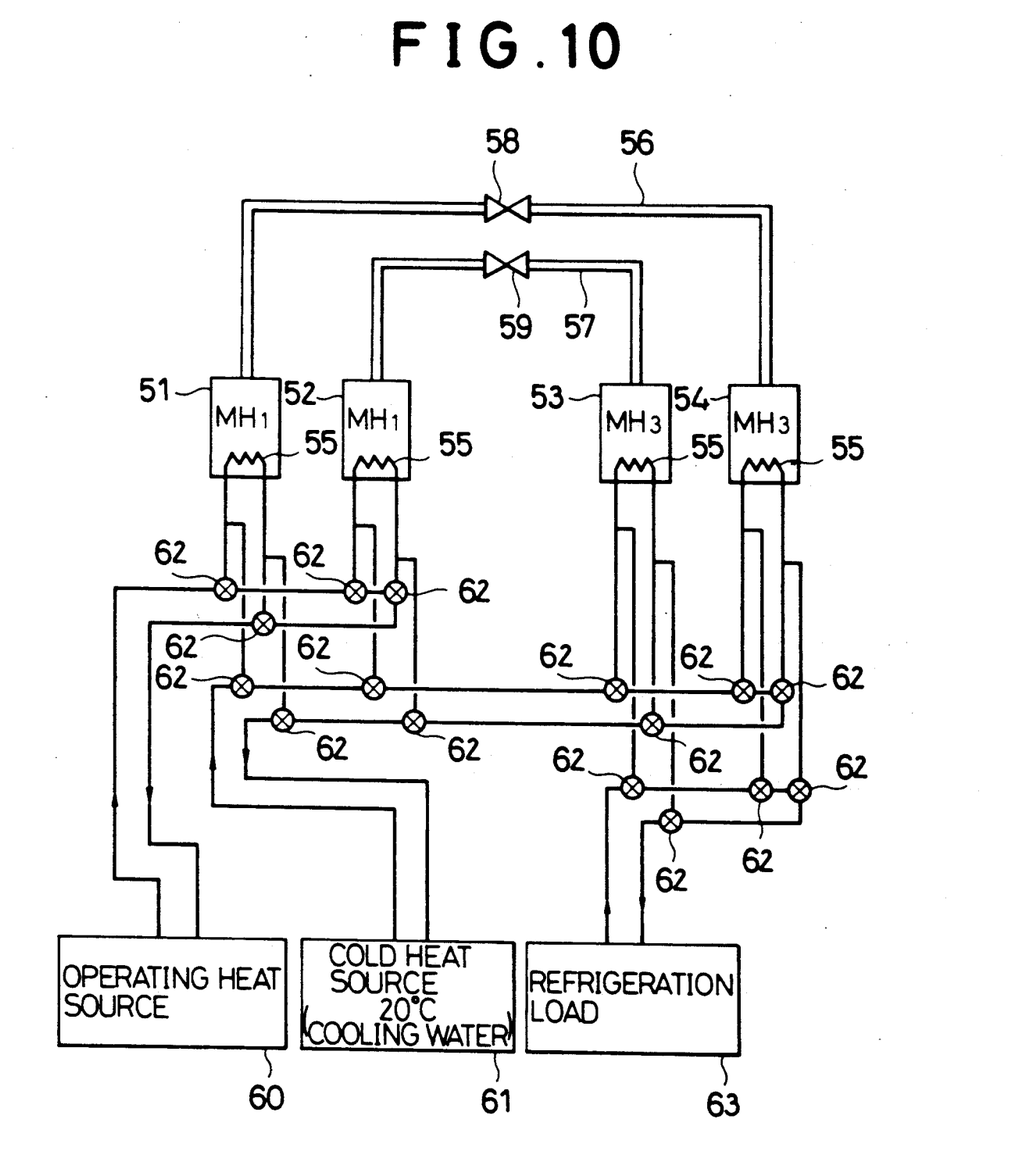
FIG. 10 shows the constitution of the cold heat generation system.

As shown in FIG. 10, containers 51, 52 that can stand high-pressure are filled with about 20 kg of MH$_1$ ground to about 100 mesh, and so are the containers 53, 54 with MH$_3$ ground to about 100 mesh. They have respective heat exchangers 55. The containers 51 and 54 are connected with a gas transport passage 56, and so are the containers 52 and 53 with the passage 57. These passages are provided therein with valves 58 and 59, respectively.

The heat exchangers 55 of the containers 51 and 52 are selectively connected with an operating heat source 60 and a cold heat source 61 by means of three-way valves 62. The heat exchangers 55 of the containers 53 and 54 are selectively connected with said cold heat source 61 and a refrigeration load 63 by means of three-way valves 62.

The operating heat source 60 is a heat source that can provide heat in the range of 100° C.~200° C. The cold heat source 61 is a heat source that may provide cooling water at ordinary temperature (say 20° C.). The refrigeration load 63 is, for example, a heat chamber. The refrigeration medium is forcibly circulated by a pump and the like.

In this thermal system a cold heat generation process and a regeneration process are simultaneously performed. In other words while the containers 51 and 54 are in the process of cold heat generation, the containers 52 and 53 are in regeneration process and vice versa, thereby continuing repetitive thermal cycles.

Figure 11:
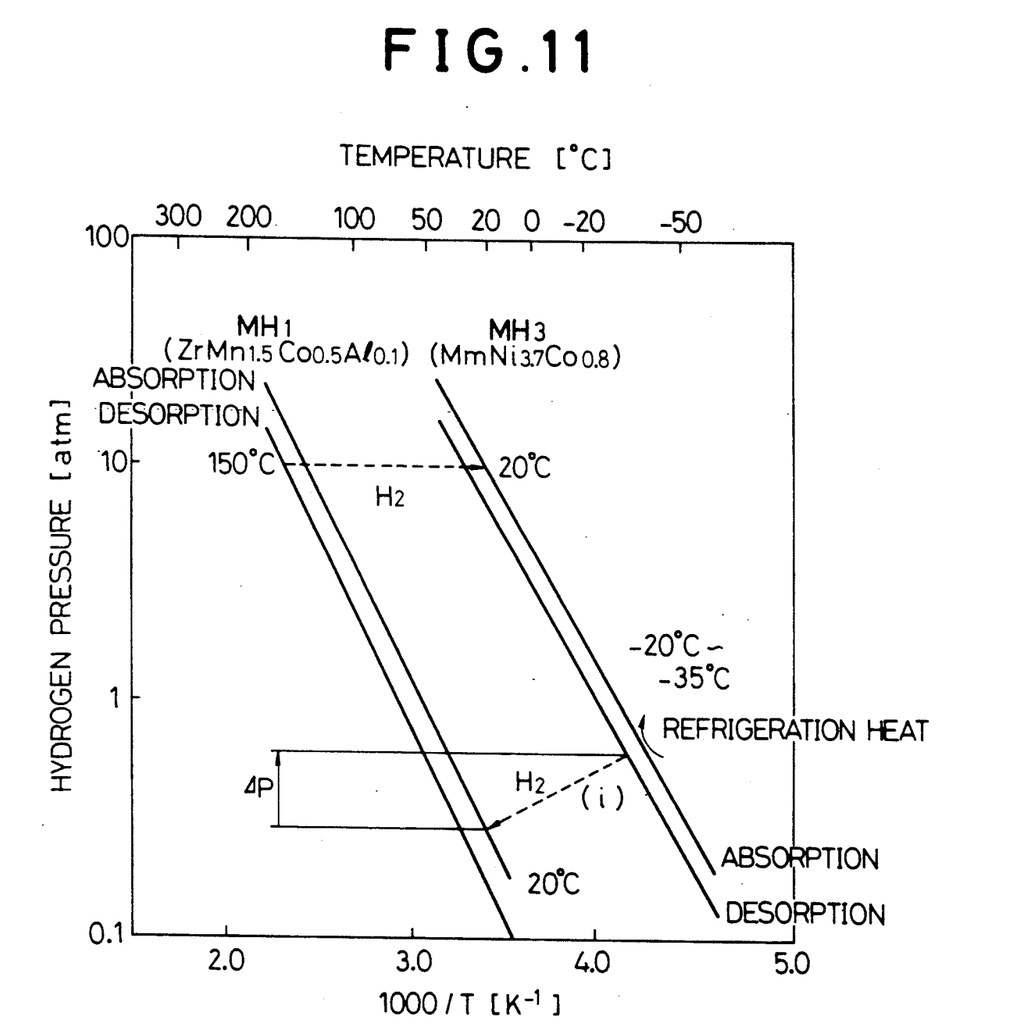
FIG. 11 is a graphical representation of the pressure-temperature characteristics of the thermal utilization system, used for explaining its operational cycle.

Referring now to FIG. 11, the process of cold heat generation is first described.

In the initial condition of the process, $MH_3$ ($MmNi_{3.7}Co_{0.8}$) in the container 54 has absorbed hydrogen at ordinary temperature and is in equilibrium with the gas at 10.0 atm, $MH_1$ ($ZrMn_{1.5}Co_{0.5}Al_{0.1}$) in the container 51 is in equilibrium with the gas at about 0.3 atm at ordinary temperature. The $MH_1$ in the container 51 is cooled with the cold heat source 61 so that it is maintained at this temperature. As the valve 58 is opened, $MH_3$ in the container 54 dissociates hydrogen, which is transported to the $MH_1$ alloy through the passage 56 and absorbed by the alloy. The alloy will generate cold heat in the range $-20°$ C.~35° C., which is provided to the refrigeration load 63 through the heat exchanger 55. The pressure for the $MH_3$ then drops to about 0.4 atm, with a resultant pressure difference ($\Delta P$) of about 0.1 atm between them. This pressure difference is necessary for further transportation of the hydrogen.

It is noted that the lower the equilibrium hydrogen absorption pressure is, the lower is the temperature of the cold heat obtained in the reaction, and hence the higher is the refrigeration performance. In this case, however, it is necessary to keep its reaction rate sufficiently high, to suppress $\Delta P$, and to ensure the amount of the cold heat. At the end of the process the valve 58 is closed.

Along with the process of cold heat generation above, a regeneration process is performed simultaneously in the containers 52 and 53; $MH_1$ is heated to 150° C., say, by connecting the heat exchanger 55 of the container 52 with the heat source 60 to raise the pressure therein to about 10.1 atm; the valve 59 is opened; and $MH_3$ of the container 53 is cooled by the cold heat source 61, thereby allowing the $MH_3$ therein to absorb the hydrogen gas transported from the container 52 to the container 53 through the transport passage 57. As a result, the pressure in the container 53 rises from about 0.4 atm to about 10.0 atm. After the above reaction is continued for 10~20 minutes, the valve 59 is closed to end the process.

Cold-heat generation cycle is continued by alternating the cold generation process and the regeneration process in the containers 51, 54 and in the containers 52, 53 in this way.

It should be noted that if the plateau inclinations and/or the hystereses of $MH_1$ and $MH_3$ used are not sufficiently small and consequently the pressure difference, defined below, exceeds the minimum value of 0.8, $MH_1$ must be heated to or above 200° C. in the above processes. It is, however, difficult to provide a convenient heat source for such heating. The pressure difference mentioned above is defined by that pressure difference in natural logarithmic scale between reversible absorption and desorption of 0.6 weight % of the hydrogen absorbing alloys. In this invention the pressure difference is maintained at or below 0.8 to ensure desired efficiency.

From safety consideration, the maximum pressure at the end of the regeneration process is suppressed not more than 20 atm by keeping the equilibrium hydrogen pressure at or less than 20 atm near the upper limit of the absorption plateau of $MH_3$ at ordinary temperature.

Along with the safety of the cold heat generation system, high thermal efficiency or the suppression of the heat loss from the pressure-proof containers may be obtained, provided that at least one of $MH_1$ and $MH_3$ satisfies the following conditions.

Namely, $MH_1$ is either;

a hydrogen absorbing alloy having $MgZn_2$-type Laves phase structure and containing at least Zr, Mn, and Co;

a hydrogen absorbing alloy having $AB_5$-type hexagonal structure and containing at least rare-earth metals (such as La, Ce, Nd, Pr, Sm and a mixture of these metals) and Ni, and at least one of the first transition metals, Al, and Sn;

a hydrogen absorbing alloy having $AB_5$-type hexagonal structure and containing at least Ca, Ni, and at least one of the first transition metals, Al, Sn, and rare-earth metals;

a hydrogen absorbing alloy having AB-type cubic structure and containing at least Ti, Fe, Ni; or a mixture of these alloys.

On the other hand $MH_3$ is either:

a hydrogen absorbing alloy having $AB_5$-type hexagonal structure and containing at least rare-earth metals (such as La, Ce, Nd, Pr, Sm and a mixture of these metals) and Ni, and at least selected one of the first transition metals, Al, and Sn;

a hydrogen absorbing alloy having $MgCu_2$-type Laves phase structure and containing at least Ti, Cr, and Mn;

a mixture of these alloys; or said hydrogen absorbing alloy having $AB_5$-type hexagonal structure and containing at least Ce.

Table below compares the performance of the thermal utilization system using these alloys with that of a conventional system.

TABLE

| | $MH_1$ | $MH_2$ | Cold heat temperature (°C.) | Maximum operating pressure (atm) |
|---|---|---|---|---|
| Prior art | $Ti_{0.6}Zr_{0.4}Mn_{1.9}Cu_{0.1}$ | $TiMn_{1.5}$ | $-5$ | about 40 |
| Embodiment 1 | $ZrMn_{1.5}Co_{0.5}Al_{0.1}$ | $MmNi_{3.7}Co_{0.8}$ | $-30$ | about 10 |
| Embodiment 2 | $MmNi_4Mn_{0.4}Co_{0.1}$ | $MmNi_{3.7}Co_{0.8}$ | $-25$ | about 10 |
| Embodiment 3 | $ZrMn_{1.7}Co_{0.2}V_{0.1}$ | $LaNi_5$ | $-15$ | about 4 |

TABLE-continued

|  | MH$_1$ | MH$_2$ | Cold heat temperature (°C.) | Maximum operating pressure (atm) |
| --- | --- | --- | --- | --- |
| Embodiment 4 | Ca$_{0.8}$La$_{0.2}$Ni$_{4.5}$Al$_{0.5}$ | La$_{0.6}$Ce$_{0.3}$Nd$_{0.1}$Ni$_5$Al$_{0.1}$ | −20 | about 10 |
| Embodiment 5 | TiFe$_{0.75}$Nb$_{0.1}$Ni$_{0.15}$ | Ti$_{1.2}$Cr$_{1.2}$Mn$_{0.8}$V$_{0.2}$ | −20 | about 10 |
| Embodiment 6 | LaNi$_5$ | Ti$_{1.2}$Cr$_{1.2}$Mn$_{0.8}$V$_{0.2}$ | −7 | about 10 |

We claim:

1. A thermal utilization system comprising:
   a first hydrogen absorbing alloy having a high temperature operation characteristic;
   a second hydrogen absorbing alloy having an intermediate temperature operation characteristic;
   a third hydrogen absorbing alloy having a low temperature operation characteristic;
   a heat source means which alternates between an elevated temperature and a reduced temperature;
   means responsive to said heat source at said reduced temperature for selecting a first thermal cycle that utilizes said first, said second and said third hydrogen absorbing alloys; and
   means responsive to said heat source at said elevated temperature for selecting a second thermal cycle that utilizes only said first and said third hydrogen absorbing alloys.

2. The thermal utilization system according to claim 1, wherein said first, second and third hydrogen absorbing alloys are rare-earth metal Ni alloys.

3. A method for providing cold heat in a thermal utilization system comprising the steps of:
   providing a first hydrogen absorbing alloy having a high temperature operation characteristic;
   providing a second hydrogen absorbing alloy having an intermediate temperature operation characteristic;
   providing a third hydrogen absorbing alloy having a low temperature characteristic;
   measuring the temperature of a heat source to determine when said heat source is at an elevated temperature and at a reduced temperature;
   selecting a first thermal cycle utilizing said first, second and third alloys when said heat source is determined to be at said reduced temperature; and
   selecting a second thermal cycle utilizing said first and third hydrogen absorbing alloys when said heat source is determined to be at said elevated temperature.

4. The thermal utilization system according to claim 3, wherein said first, second and third hydrogen absorbing alloys are rare-earth metal Ni alloys.

* * * * *